US011863939B2

(12) United States Patent
Riepenhoff et al.

(10) Patent No.: US 11,863,939 B2
(45) Date of Patent: Jan. 2, 2024

(54) SYSTEMS AND METHODS FOR FACILITATING USER CONTROL OF AMBIENT SOUND ATTENUATION DURING AN AUDIO STREAMING SESSION

(71) Applicant: SONOVA AG, Staefa (CH)

(72) Inventors: Matthias Riepenhoff, Hombrechtikon (CH); Erwin Kuipers, Wolfhausen (CH)

(73) Assignee: Sonova AG, Staefa (CH)

( * ) Notice: Subject to any disclaimer, the term of this patent is extended or adjusted under 35 U.S.C. 154(b) by 88 days.

(21) Appl. No.: 17/573,918

(22) Filed: Jan. 12, 2022

(65) Prior Publication Data

US 2023/0224648 A1 Jul. 13, 2023

(51) Int. Cl.
*H04R 25/00* (2006.01)

(52) U.S. Cl.
CPC ........... *H04R 25/554* (2013.01); *H04R 25/43* (2013.01); *H04R 25/505* (2013.01); *H04R 2225/41* (2013.01); *H04R 2225/43* (2013.01); *H04R 2225/55* (2013.01); *H04R 2420/07* (2013.01)

(58) Field of Classification Search
CPC .... H04R 25/70; H04R 25/505; H04R 25/558; H04R 2225/41; H04R 2225/55; H04R 2225/61; H04R 2460/07
See application file for complete search history.

(56) References Cited

U.S. PATENT DOCUMENTS 10,652,646 B2 5/2020 Grinker
10,853,025 B2 * 12/2020 Klimanis ................ H04L 67/52
11,457,318 B2 * 9/2022 Wiss .................... H04R 25/652

OTHER PUBLICATIONS

McKinney, Martin. WO 2021/138648 A1. Ear-Worn Electronic Device Employing Acoustic Environment Adaptation (Year: 2021).*

* cited by examiner

*Primary Examiner* — Brian Ensey
(74) *Attorney, Agent, or Firm* — ALG Intellectual Property, LLC

(57) ABSTRACT

An exemplary system includes a memory storing instructions and a processor communicatively coupled to the memory and configured to execute the instructions to determine that an audio streaming session is to be initiated in which an audio signal is streamed to a hearing device, provide, based on the determining that the audio streaming session is to be initiated, an option for a user to select an ambient sound attenuation setting for use by the hearing device during the audio streaming session, detect a selection by the user of the option; and direct, based on the user selecting the option, the hearing device to initiate the audio streaming session and attenuate, in accordance with the ambient sound attenuation setting, ambient sound during the audio streaming session.

18 Claims, 10 Drawing Sheets

SYSTEMS AND METHODS FOR FACILITATING USER CONTROL OF AMBIENT SOUND ATTENUATION DURING AN AUDIO STREAMING SESSION

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Wireless communication technology provides such hearing devices with the capability of wirelessly connecting to external devices for programming, controlling, and/or streaming audio content to the hearing devices. For example, a Bluetooth protocol may be used to establish a Bluetooth wireless link between a hearing device and a tablet computer. Through the Bluetooth wireless link, the tablet computer may stream audio content to the hearing device, which then passes the audio content on to the user (e.g., by way of the receiver). While streaming the audio content, the hearing device may perform one or more operations to reduce the amount of ambient sound perceived by the user. For example, the hearing device may control an open/close state of a vent of the hearing device. However, the user typically has no control over the state of a vent and/or the amount of ambient sound perceived by the user by way of the hearing device while the hearing device streams the audio content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
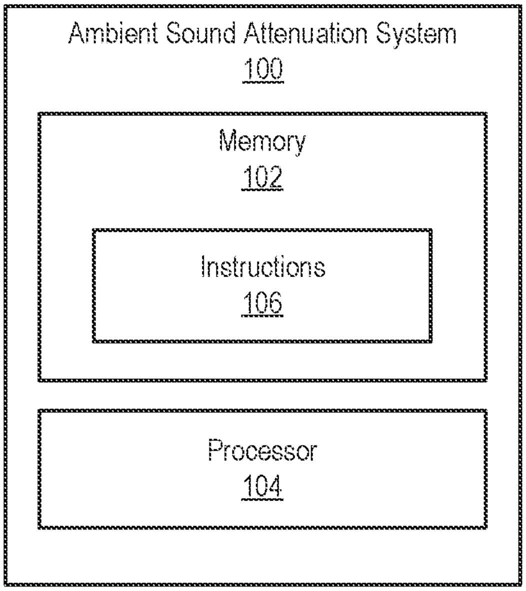
FIG. 1 illustrates an exemplary ambient sound attenuation system that may be implemented according to principles described herein.

Systems and methods for facilitating user control of ambient sound attenuation during an audio streaming session are described herein. As will be described in more detail below, an exemplary system may comprise a memory storing instructions and a processor communicatively coupled to the memory and configured to execute the instructions to determine that an audio streaming session is to be initiated in which an audio signal is streamed to a hearing device, provide, based on the determining that the audio streaming session is to be initiated, an option for a user to select an ambient sound attenuation setting for use by the hearing device during the audio streaming session, detect a selection by the user of the option, and direct, based on the user selecting the option, the hearing device to initiate the audio streaming session and attenuate, in accordance with the ambient sound attenuation setting, ambient sound during the audio streaming session.

By providing systems and methods such as those described herein, it may be possible to provide enhanced user interfaces to facilitate user control of ambient sound attenuation. For example, systems and methods such as those described herein may provide specialized user interfaces to facilitate a user easily selecting one or more ambient sound attenuation settings for a hearing device to use upon initiation of an audio streaming session. In addition, the systems and methods described herein may facilitate a user easily changing ambient sound attenuation settings during an audio streaming session based on the user's preferences. Other benefits of the systems and methods described herein will be made apparent herein.

As used herein, a "hearing device" may be implemented by any device or combination of devices configured to provide or enhance hearing to a user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

As used herein, an “audio streaming session” may refer to any instance where an audio signal may be streamed or otherwise provided to a hearing device to facilitate presenting audio content by way of the hearing device to a user, Such an audio signal may represent any suitable type of audio content as may serve a particular implementation. For example, an audio signal that may be streamed to a hearing device may represent audio content from an audio phone call, a video phone call, a music streaming session, a media program (e.g., television programs, movies, podcasts, etc.) streaming session, a video game session, an augmented reality session, a virtual reality session, and/or in any other suitable instance. In certain examples, the audio signal provided during an audio streaming session may originate from a computing device (e.g., a smartphone, a tablet computer, a gaming device, etc.) that is external to hearing device. In certain alternative implementations, the audio signal provided during an audio streaming session may originate, for example, from an internal memory of a hearing device. For example, such an internal memory may store audio content (e.g., music, audiobooks, etc.) that may be played back by way of the hearing device to a user of the hearing device during an audio streaming session.

FIG. 1 illustrates an exemplary ambient sound attenuation system 100 (system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data associated with ambient sound attenuation settings, user input information, user interface information, notification information, context information, hearing profile information, graphical user interface content, and/or any other suitable data.

Processor 104 may be configured to perform (e.g., execute instructions 106 stored in memory 102 to perform) various processing operations associated with attenuating ambient sound during an audio streaming session. For example, processor 104 may perform one or more operations described herein to provide one or more options for a user to select an ambient sound attenuation setting for use by a hearing device during an audio streaming session. These and other operations that may be performed by processor 104 are described herein.

Figure 2:
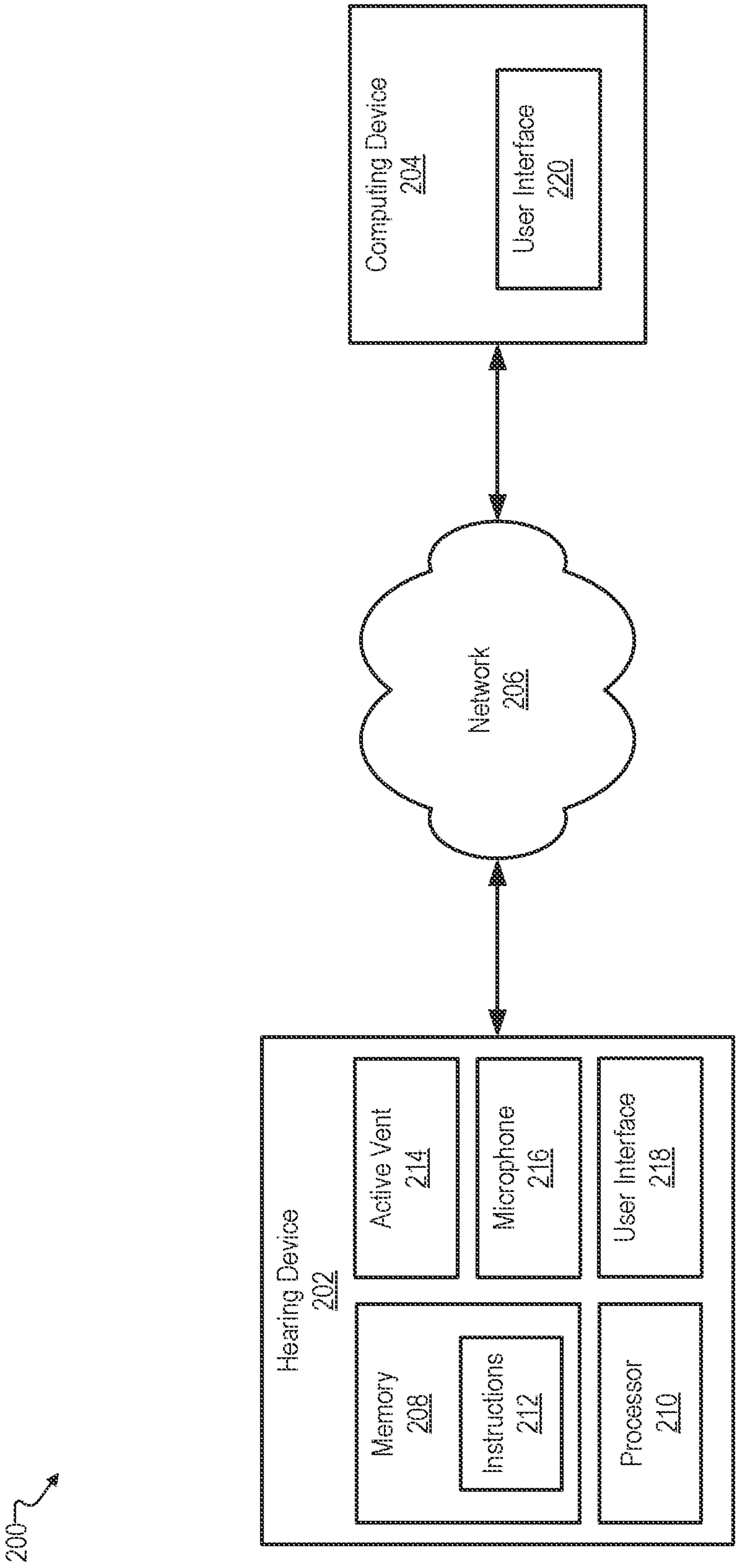
FIG. 2 illustrates an exemplary implementation of the ambient sound attenuation system of FIG. 1 according to principles described herein.

System 100 may be implemented in any suitable manner. For example, system 100 may be implemented as a hearing device, a communication device communicatively coupled to the hearing device, or a combination of the hearing device and the communication device. FIG. 2 shows an exemplary implementation 200 in which system 100 may be provided in certain examples. As shown in FIG. 2, implementation 200 includes a hearing device 202 that is separate from and communicatively coupled to a computing device 204 by way of a network 206.

Hearing device 202 may include, without limitation, a memory 208 and a processor 210 selectively and communicatively coupled to one another. Memory 208 and processor 210 may each include or be implemented by hardware and/or software components (e.g., processors, memories, communication interfaces, instructions stored in memory for execution by the processors, etc.). In some examples, memory 208 and processor 210 may be housed within or form part of a BTE housing. In some examples, memory 208 and processor 210 may be located separately from a BTE housing (e.g., in an ITE component). In some alternative examples, memory 208 and processor 210 may be distributed between multiple devices (e.g., multiple hearing devices in a binaural hearing system) and/or multiple locations as may serve a particular implementation.

Memory 208 may maintain (e.g., store) executable data used by processor 210 to perform any of the operations associated with hearing device 202. For example, memory 208 may store instructions 212 that may be executed by processor 210 to perform any of the operations associated with hearing device 202 assisting a user in hearing and/or any of the operations described herein. Instructions 212 may be implemented by any suitable application, software, code, and/or other executable data instance.

Memory 208 may also maintain any data received, generated, managed, used, and/or transmitted by processor 210. For example, memory 208 may maintain any suitable data associated with a hearing loss profile of a user and/or user interface data. Memory 208 may maintain additional or alternative data in other implementations.

Processor 210 is configured to perform any suitable processing operation that may be associated with hearing device 202. For example, when hearing device 202 is implemented by a hearing aid device, such processing operations may include monitoring ambient sound and/or representing sound to a user via an in-ear receiver, Processor 210 may be implemented by any suitable combination of hardware and software.

As shown in FIG. 2, hearing device 202 further includes an active vent 214, a microphone 216, and a user interface 220 that may each be controlled in any suitable manner by processor 210.

Active vent 214 may be configured to dynamically control opening and closing of a vent opening in hearing device 202 (e.g., a vent opening in an ITE component). Active vent 214 may be configured to control a vent opening by way of any suitable mechanism and in any suitable manner. For example, active vent 214 may be implemented by an actuator that opens or closes a vent opening based on a user input. One example of an actuator that may be used as part of active vent 214 is an electroactive polymer that exhibits a change in size or shape when stimulated by an electric field. In such examples, the electroactive polymer may be placed in a vent opening or any other suitable location within hearing device 202. In a further example, active vent 214 may use an electromagnetic actuator to open and close a vent opening. In a further example, active vent 214 may not only fully open and close, but may be positioned in any one of various intermediate positions (e.g., a half open position, a one third open position, a one fourth open position, etc.) during an audio streaming session. In a further example, active vent 214 may be either fully open or fully closed during an audio streaming session.

In some implementations, in place of active vent 214, hearing device 202 may additionally or alternatively comprise an active noise control (ANC) circuit configured to attenuate an ambient sound directly entering the ear of the user by actively adding another sound outputted by the hearing device which is specifically designed to at least partially cancel the direct ambient sound. Such an ANC circuit may comprise a feedback loop including an ear canal microphone configured to be acoustically coupled to the ear canal of the user, and a controller connected to the ear canal microphone. The controller may thus provide an ANC control signal to modify the sound waves generated by a receiver (e.g., a speaker) of the hearing device (e.g., in addition to outputting an additional audio content such as a streamed audio signal, or without outputting an additional audio content). The ANC circuit may thus be configured to modify the sound waves generated by the receiver depending on the control signal (e.g., after a processing of the microphone signal provided by the ear canal microphone) to attenuate the ambient sound entering the user's ear. The processing of the microphone signal may comprise at least one of a filtering, adding, subtracting, or amplifying of the microphone signal. In some other examples, the ANC circuit may comprise a feed forward loop including a microphone external from the ear canal, which may also be implemented in addition to the feedback loop.

Microphone 216 may be configured to detect ambient sound in an environment surrounding a user of hearing device 202. Microphone 216 may be implemented in any suitable manner. For example, microphone 216 may include a microphone that is arranged so as to face outside an ear canal of a user while an ITE component of hearing device 202 is worn by the user.

User interface 218 may include any suitable type of user interface as may serve a particular implementation. For example, user interface 218 may include one or more buttons provided on a surface of hearing device 202 that are configured to control functions of hearing device 202. For example, such buttons may be mapped to and control power, volume, or any other suitable function of hearing device 202. In certain examples, functions of the buttons may be temporarily changed to different functions to facilitate a user selecting an ambient sound attenuation setting. For example, a first button of user interface 218 may have a first function during normal operation of hearing device. However, the first button of user interface 218 may be temporarily changed to a second function associated with an audio streaming session.

In certain alternative implementations, user interface 218 may include only one button that may be configured to facilitate selection of one or more ambient sound attenuation settings. In such examples, a duration of a user input with respect to the single button may be used to select either a first ambient sound attenuation setting or a second ambient sound attenuation setting. For example, a short press of the single button may be provided by the user to select the first ambient sound attenuation setting whereas a relatively longer press of the single button may be provided by the user to select the second ambient sound attenuation setting.

Additionally or alternatively, user interface 218 may be implemented by one or more sensors configured to detect motion or orientation of hearing device 202 while worn by a user. For example, such sensors may be configured to detect any suitable movement of a user's head that may be predefined to facilitate the user selecting an ambient sound attenuation setting. Exemplary implementations of user interface 218 are described further herein.

Computing device 204 may be configured to stream an audio signal to hearing device 202 by way of network 206 during an audio streaming session. Computing device 204 may include or be implemented by any suitable type of computer device or combination of computing devices as may serve a particular implementation. For example, computing device 204 may be implemented by a desktop computer, a laptop computer, a smartphone, a tablet computer, a television, a radio, a head mounted display device, a dedicated remote control device, a virtual reality ("VR") device, an augmented reality ("AR") device, an internet-of-things ("IoT") device, a gaming device, and/or any other suitable device that may be configured to facilitate streaming an audio signal to hearing device 202.

As shown in FIG. 2, computing device 204 includes a user interface 220 that may be configured to receive one or more inputs from a user. User interface 218 may correspond to any suitable type of user interface as may serve a particular implementation. For example, user interface 220 may correspond to a graphical user interface (e.g., displayed by a display screen of a smartphone), a holographic display interface, a VR interface, an AR interface, etc. Exemplary implementations of user interface 220 are described further herein.

Network 206 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between hearing device 202 and computing device 204. In certain examples, network 206 may be implemented by a Bluetooth protocol and/or any other suitable communication protocol to facilitate communications between hearing device 202 and computing device 204. Communications between hearing device 202, computing device 204, and any other device/system may be transported using any one of the above-listed networks, or any combination or sub-combination of the above-listed networks.

System 100 may be implemented by hearing device 202 or computing device 204. Alternatively, system 100 may be distributed across hearing device 202 and computing device 204, and/or any other suitable computing system/device.

Figure 3:
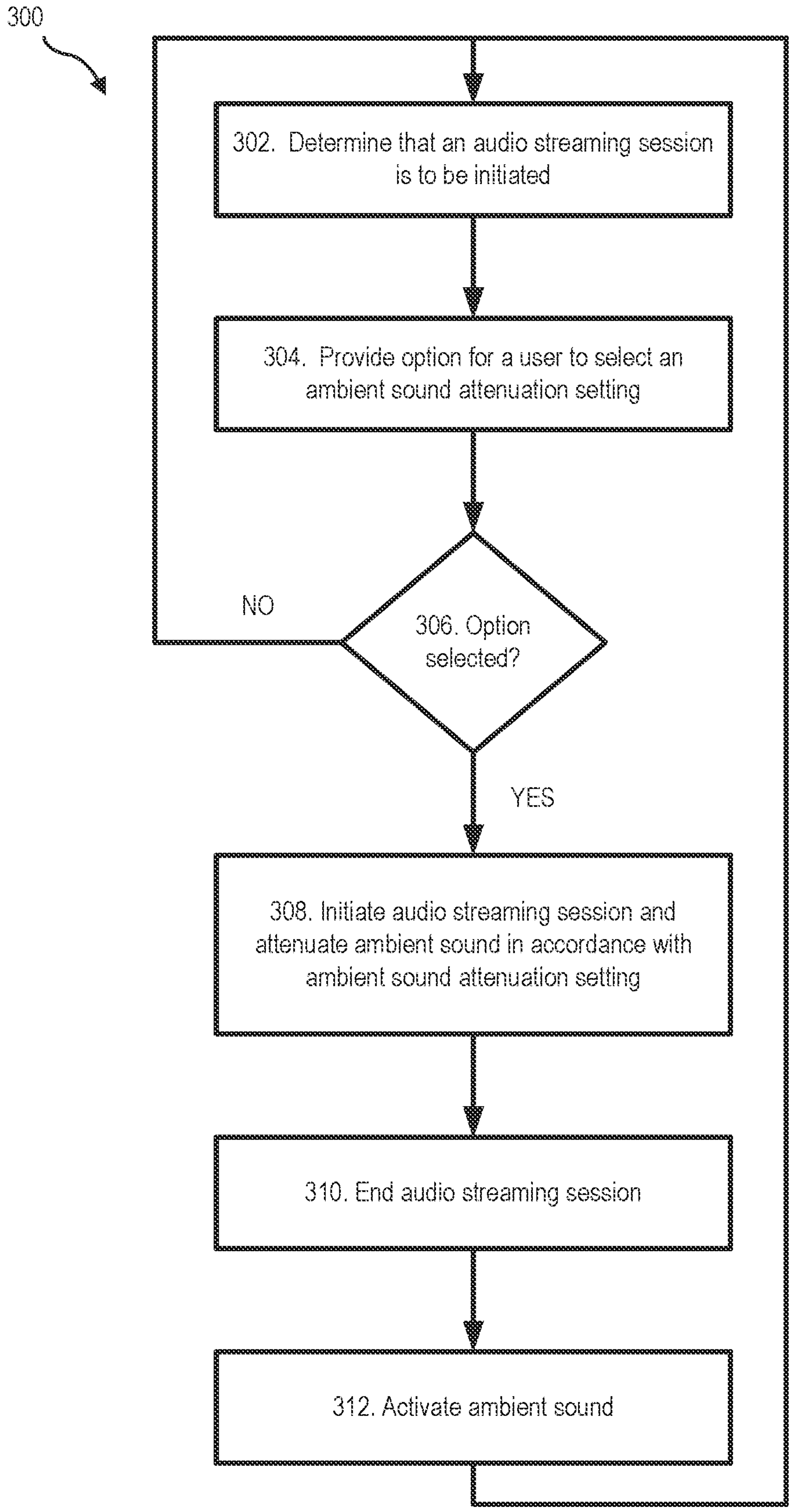
FIG. 3 illustrates an exemplary flow diagram that may be implemented according to principles described herein.

During an audio streaming session, it may be desirable to attenuate ambient sound so that a user of hearing device 202 may better perceive the audio content represented in an audio signal streamed to hearing device 202. FIG. 3 illustrates an exemplary flow diagram 300 depicting various operations that may be performed by system 100 to facilitate attenuating ambient sound during an audio streaming session. At operation 302, system 100 may determine that an audio streaming session is to be initiated. This may be accomplished in any suitable manner. For example, if the audio streaming session is associated with a phone call, system 100 may determine that the audio streaming session is to be initiated based on an incoming call notification being received by, for example, a smartphone that may be implemented as computing device 204. In certain alternative implementations, system 100 may determine that an audio streaming session is to be initiated based on a user initiating an application on computing device 204.

At operation 304, system 100 may provide an option for a user to select an ambient sound attenuation setting for use by hearing device 202 during the audio streaming session. System 100 may provide the option in any suitable manner as may serve a particular implementation. For example, system 100 may provide the option by way of user interface 218 of hearing device 202 and/or by way of user interface 220 of computing device 204. The option may be provided by way of any suitable user selectable button, graphical object, motion command, etc. that a user may interact with or otherwise perform to facilitate selecting an ambient sound attenuation setting. For example, user interface 218 of hearing device 202 may include a button that a user may interact with to adjust a function of hearing device 202, System 100 may configure the button of hearing device 202 to be used to select the ambient sound attenuation setting in any suitable manner. For example, the button may be initially configured to control a first function (e.g., volume control) of hearing device 202. Based on the determination that an audio streaming session is to be initiated, system 100 may change the function of the button from the first function to a second function that is associated with selecting an ambient sound attenuation setting option. In certain examples, the button may be configured to be used to select the ambient sound attenuation setting option for a predefined period of time (e.g., five seconds to twenty seconds) associated with the audio streaming session. After expiration of the predefined period of time, system 100 may cause the function of the button to change from the second function back to the first function.

In certain examples, the providing of the option may include concurrently providing a plurality of options that may be alternatively selected by a user to facilitate attenuating ambient sound during an audio streaming session. System 100 may provide any suitable number of options as may serve a particular implementation. For example, user interface 218 of hearing device 202 may be configured to receive a first user input command to select a first attenuation setting option and a second user input command to select a second attenuation setting option. The first attenuation setting option may be different than the second attenuation setting option. The first attenuation setting option may result in a reduction of the loudness of ambient sound perceived by the user of hearing device 202 to be at or below a first predefined value and the second attenuation setting option may result in a reduction of the loudness of ambient sound perceived by the user to be at or below a second predefined value. Additionally or alternatively, user interface 220 of computing device 204 may be a graphical user interface on which a first attenuation setting option and a second attenuation setting option are provided for display. Specific examples of options that may be provided in different implementations to facilitate selection of one or more ambient sound attenuation settings are described further herein.

At operation 306, system 100 may determine whether the option has been selected by a user. This may be accomplished in any suitable manner. For example, system 100 may determine that the user has provided a user input with respect to a button of hearing device 202. In certain alternative examples, system 100 may determine that the user has provided a user input (e.g., a touch input) with respect to a graphical object displayed on a graphical user interface of computing device 204. If the answer at operation 306 is "NO," the flow may return to before operation 302, as shown in FIG. 3. However, if the answer at operation 306 is "YES," system 100 may initiate the audio streaming session and attenuate the ambient sound in accordance with the ambient sound attenuation setting at operation 308, In such examples, the same user input selecting the option may result in both the initiation of the audio streaming session and the selecting of the ambient sound attenuation setting.

System 100 may attenuate the ambient sound during the audio streaming session in any suitable manner. In certain examples, the attenuating of the ambient sound may include directing hearing device 202 to change a loudness of the ambient sound that the user perceives by way of hearing device 202 to be at or below a predefined value. For example, the loudness of the ambient sound that the user perceives by way of hearing device 202 may be reduced to a range of 6 decibels-12 decibels. In certain examples, the attenuating of the ambient sound may include using one or more filters to remove, for example, high frequency or low frequency components of ambient sound to aid a user's perception of audio content during an audio streaming session.

In certain alternative examples, the attenuating of the ambient sound may include directing hearing device 202 to mute microphone 216 to substantially prevent ambient sound from being perceived by the user of hearing device 202 during an audio streaming session.

In certain examples, system 100 may automatically adjust an ambient sound attenuation setting during an audio streaming session. As used herein, the expression "automatically" means that an operation (e.g., an opening or closing of active vent 214) or series of operations are performed without requiring further input from a user. For example, after operation 308, system 100 may detect a change in context in the environment surrounding a user of hearing device 202 during the audio streaming session and may automatically adjust an ambient sound attenuation setting based on the change in context.

Additionally or alternatively, the attenuating of the ambient sound may include dynamically controlling operation of active vent 214. For example, in certain implementations, system 100 may close active vent 214 upon initiation of the audio streaming session. In certain alternative implementations, system 100 may dynamically control operation of active vent 214 during the audio streaming session based on one or more factors associated with the user and/or the audio streaming session. For example, system 100 may dynamically control operation of active vent 214 based a detected context of the audio streaming session, an ambient sound level during the audio streaming session, user preference data, and/or any other suitable information. To illustrate an example, if system 100 determines that the user is in a loud environment (e.g., in a restaurant or another crowded noisy location) during the audio streaming session, system 100 may dynamically close active vent 214, System 100 may determine, in any suitable manner, that the user has left the loud environment and has entered a quiet environment. Based on such a determination, system 100 may direct hearing device 202 to automatically open active vent 214 during the audio streaming session.

Additionally or alternatively, the attenuating of the ambient sound may include dynamically controlling operation of an active noise control (ANC) circuit, which may be implemented in hearing device 202. For example, in certain implementations, system 100 may evoke or enhance an attenuation of ambient sound directly entering the user's ear by the ANC circuit upon initiation of the audio streaming session. In certain alternative implementations, system 100 may dynamically control operation of the ANC circuit during the audio streaming session based on one or more factors associated with the user and/or the audio streaming session. For example, system 100 may dynamically control operation of the ANC circuit based a detected context of the audio streaming session, an ambient sound level during the audio streaming session, user preference data, and/or any other suitable information.

In examples where hearing device 202 is implemented as part of a binaural hearing system, operation 308 may include directing each hearing device included in the binaural hearing system to implement the ambient sound attenuation setting in any suitable manner. For example, in certain implementations, system 100 may direct each hearing device included in the binaural hearing system to implement the same ambient sound attenuation setting. In certain alternative implementations, system 100 may direct each hearing device included in the binaural hearing system to implement a different ambient sound attenuation setting. For example, system 100 may direct a first hearing device included in a binaural system to close an active vent of the first hearing device and system 100 may direct a second hearing device included in the binaural system 10 keep an active vent of the second hearing device open.

At operation 310, system 100 may end the audio streaming session. System 100 may end the audio streaming session in any suitable manner and in response to any suitable information indicating that the audio streaming session is over. For example, system 100 may end the audio streaming session in response to the user hanging up a phone call. In certain alternative implementations, system 100 may end the audio streaming session based on the user turning off a device that is used to stream the audio signal to hearing device 202. For example, in instances where computing device 204 corresponds to a television, system 100 may end the audio streaming session in response to a user input that turns off the television.

At operation 312, system 100 may perform any suitable operation to activate the ambient sound. For example, system 100 may direct hearing device 202 to open active vent 214. Additionally or alternatively, system 100 may direct hearing device to stop attenuating the ambient sound based on the ambient sound attenuation setting selected by way of the option. After operation 312, the flow may then return to before operation 302, as shown in FIG. 3.

Figure 4:
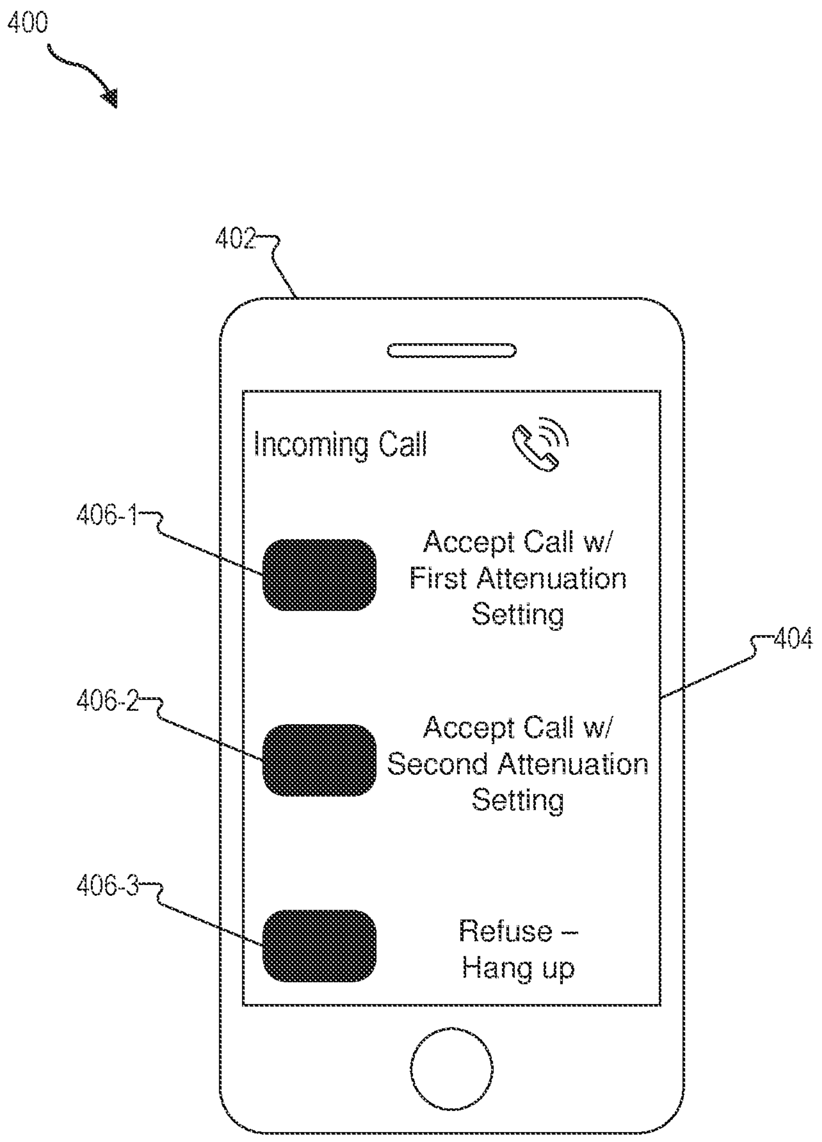
FIG. 4 illustrates an exemplary user interface that may be provided for display on a display screen of a computing device according to principles described herein.

FIG. 4 shows an exemplary implementation 400 in which computing device 204 may be implemented as a smartphone 402 and an audio streaming session is associated with a phone call received by smartphone 402. As shown in FIG. 4, smartphone 402 includes a display screen 404 on which a graphical user interface is provided for display that includes a plurality of options 406 (e.g., options 406-1 through 406-3) that a user may interact with when determining whether to accept the incoming call. In the example shown in FIG. 4, the graphical user interface may be considered as a non-native incoming call screen as opposed to a native incoming call screen. A native incoming call screen may refer to a standard incoming call screen (i.e., a default incoming call screen) of smartphone 402. A non-native incoming call screen such as that shown in FIG. 4, may refer to any other type of incoming call screen that may be provided in addition to, or in replacement of, a native incoming call screen, such as an incoming call screen that is provided by an application installed and running on smartphone 402.

Option 406-1 may be selected by a user to both accept the phone call and select a first attenuation setting to be used by hearing device 202 during the phone call. Option 406-2 may be selected by the user to both accept the phone call and select a second attenuation setting to be used by hearing device 202 during the phone call. Option 406-3 may be selected by the user to decline the phone call.

The exemplary options 406 depicted in FIG. 4 are provided for illustrative purposes. It is understood that any suitable number of additional or alternative options may be provided in certain implementations. For example, an additional or alternative option may include an option to accept the phone call without ambient sound attenuation.

Figure 5:
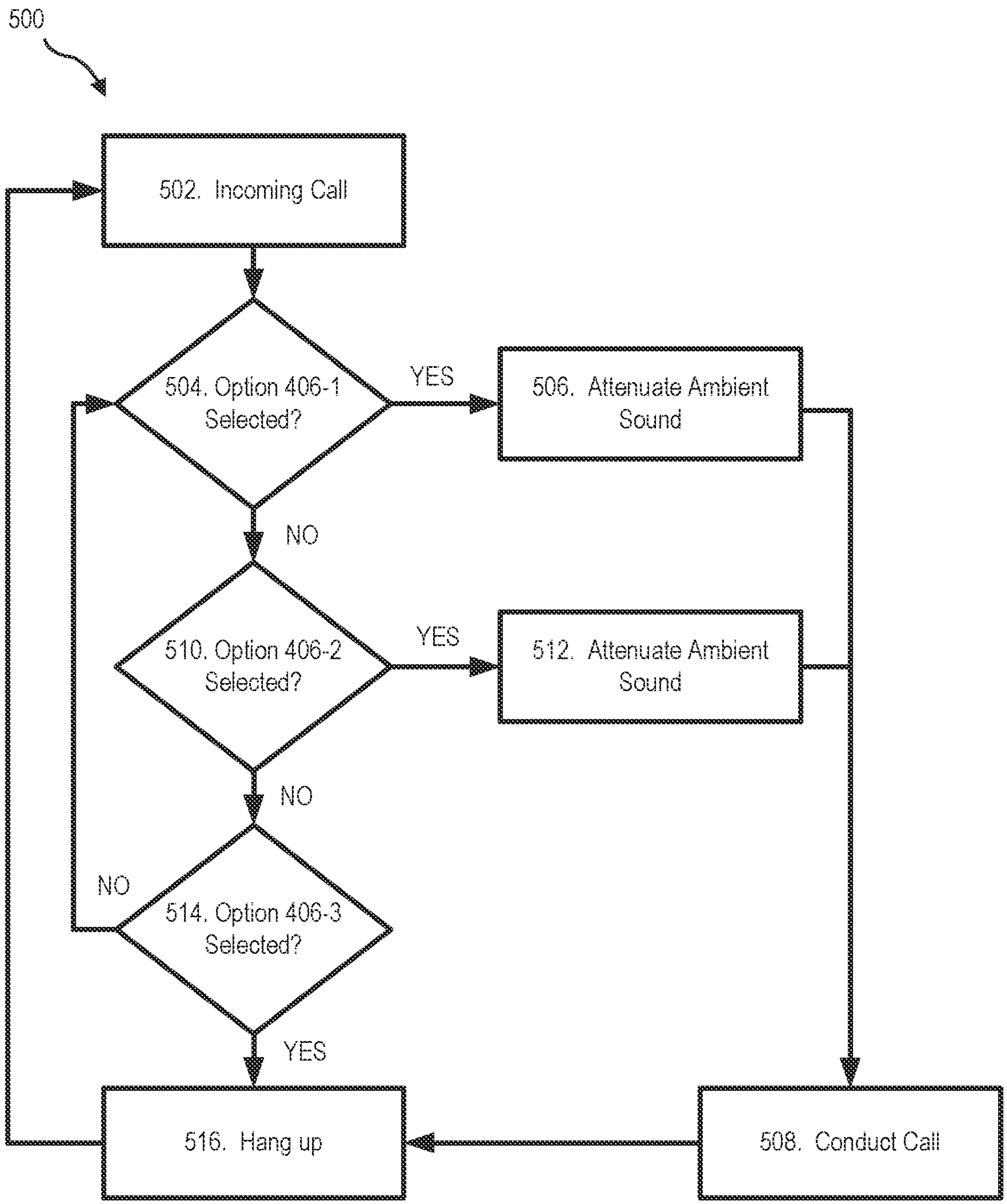
FIG. 5 illustrates another exemplary flow diagram that may be implemented according to principles described herein.

FIG. 5 illustrates an exemplary flow diagram 500 that depicts various operations that may be performed by system 100 in conjunction with the graphical user interface depicted in FIG. 4. At operation 502, system 100 may detect an incoming call to smartphone 402 based on an incoming call notification being provided to smartphone 402. Based on the incoming call, system 100 may direct smartphone 402 to provide the graphical user interface depicted in FIG. 4 for display on display screen 404 of smartphone 402.

At operation 504, system 100 may determine whether option 406-1 has been selected by the user. For example, system 100 may determine whether the user has provided a touch input with respect to option 406-1. If the answer at operation 504 is "YES," system 100 may direct smartphone 402 to accept the phone call and direct hearing device 202 to attenuate the ambient sound during the phone call in accordance with the first ambient sound attenuation setting at operation 506. For example, system 100 may direct hearing device 202 to change the loudness of the ambient sound that the user perceives by way of hearing device 202 to be at or below a predefined value and/or close active vent 214.

At operation 508, the call may be conducted in which an audio signal representing audio content of the phone call is streamed from smartphone 402 to hearing device 202 while hearing device 202 uses the first ambient sound attenuation setting.

If the answer at operation 504 is "NO," system 100 may determine whether option 406-2 has been selected by the user at operation 510. If the answer at operation 510 is "YES," system 100 may direct smartphone 402 to accept the phone call and direct hearing device 202 to attenuate the ambient sound during the phone call in accordance with the second ambient sound attenuation setting at operation 512. For example, system 100 may direct hearing device 202 to mute microphone 216 and/or close active vent 214.

The flow then may proceed to operation 508, at which the call may be conducted in which an audio signal representing audio content of the phone call is streamed from smartphone 402 to hearing device 202 while hearing device 202 uses the second ambient sound attenuation setting.

If the answer at operation 510 is "NO," system 100 may determine whether option 406-3 has been selected at operation 514. If the answer at operation 514 is "YES," system 100 may direct smartphone 402 to hang up the phone call at operation 516. The flow may then proceed until an additional incoming call may be detected.

If the answer at operation 514 is "NO," the flow may return to operation 504 and operations 504, 510, and 514 may be repeated until either the user selects one of options 406 or the entity making the phone call to smartphone 402 cancels the phone call.

Figure 6:
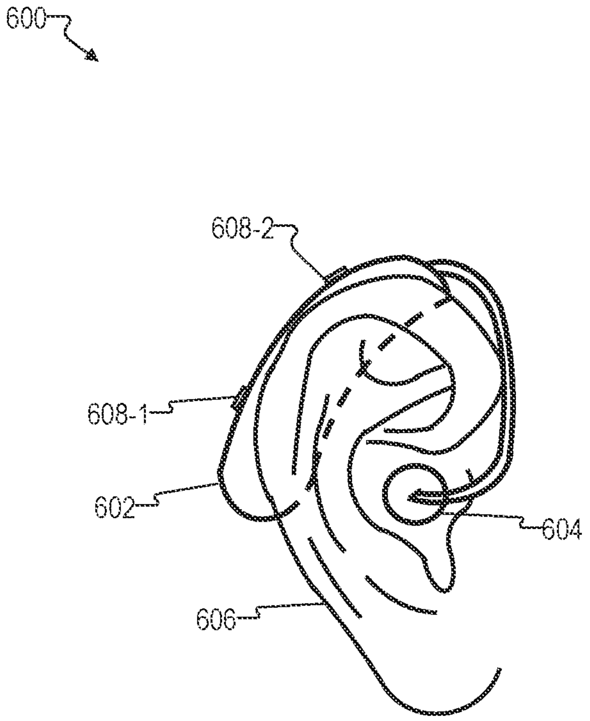
FIG. 6 illustrates an exemplary user interface of a hearing device that may be implemented according to principles described herein.

FIG. 6 shows an exemplary implementation 600 in which hearing device 202 is implemented as a BTE component 602 that is communicatively connected to an ITE component 604. As shown in FIG. 6, BTE component 602 is configured to be worn behind an ear 606 of a user and ITE component 604 is configured to be at least partially inserted within an ear canal of the user. In the example shown in FIG. 6, BTE component 602 includes a user interface comprising a plurality of buttons 608 (e.g., buttons 608-1 and 608-2) provided on an outer surface of BTE component 602. Buttons 608 are selectable by a user by way of a press input or a touch input. In the example shown in FIG. 6, button 608-1 may be selectable by a user to cause BTE component and/or ITE component to use a first ambient sound attenuation setting and button 608-2 may be selectable by a user to cause BTE component and/or ITE component to use a second ambient sound attenuation setting.

The number and/or positions of buttons 608 shown in FIG. 6 are provided for illustrative purposes. It is understood that any suitable number of buttons 608 may be provided as may serve a particular implementation. In addition, buttons 608 may be provided at any suitable position as may serve a particular implementation. In certain alternative implementations, one or more buttons may be provided as part of ITE component 604.

Figure 7:
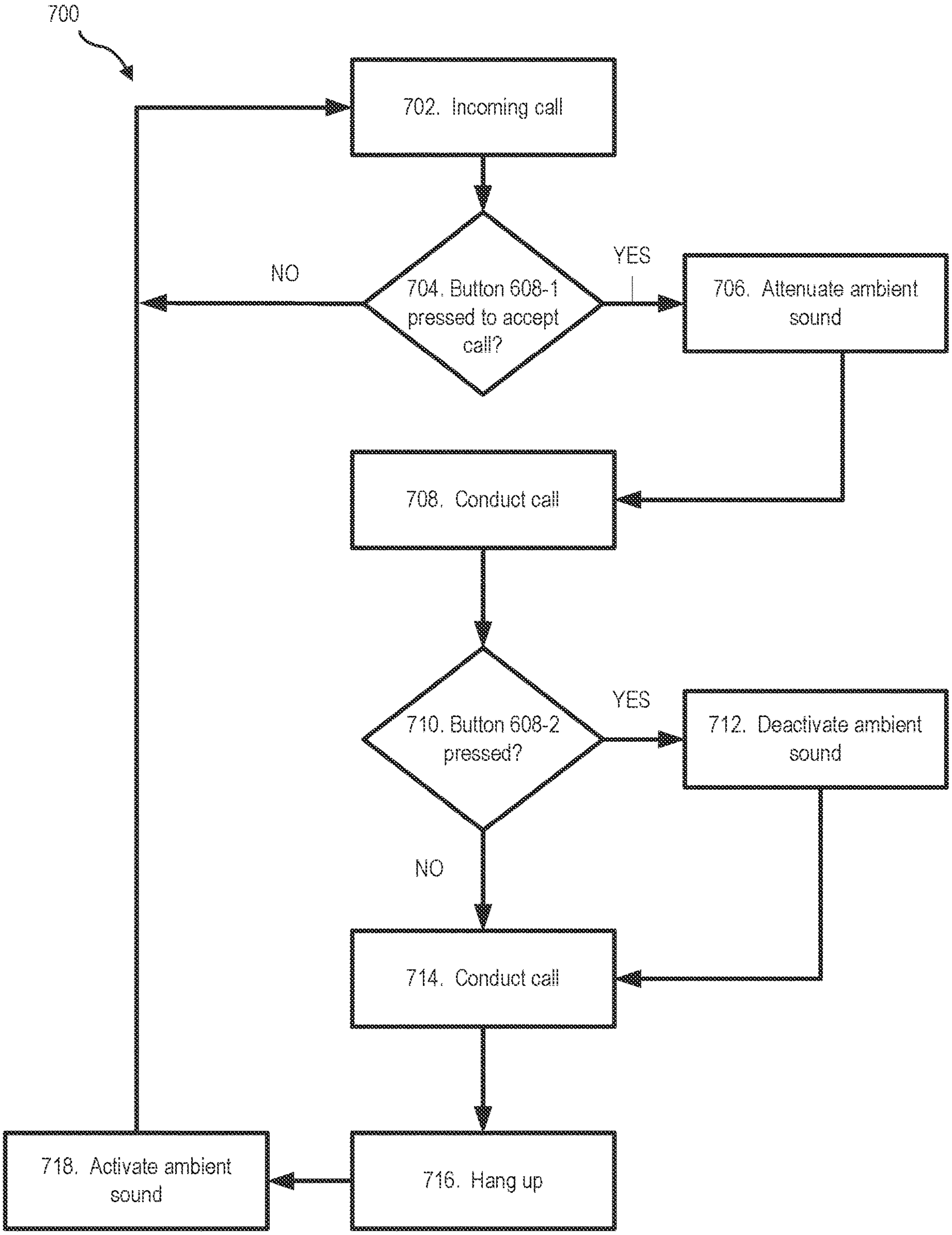
FIG. 7 illustrates an additional exemplary flow diagram that may be implemented according to principles described herein.

FIG. 7 illustrates an exemplary flow diagram 700 that depicts various operations that may be performed by system 100 in conjunction with the exemplary user interface depicted in FIG. 6 when an audio streaming session is associated with a phone call. At operation 702, system 100 may detect an incoming phone call in any suitable manner such as described herein. At operation 704, system 100 may determine whether button 608-1 has been pressed by the user to accept the phone call and attenuate the ambient sound during the phone call using a first ambient sound attenuation setting. If the answer at operation 704 is "NO," system 100 may determine that the user has declined the call and may return the flow to operation 702 to detect an additional incoming call.

If the answer at operation 704 is "YES," system 100 may initiate the phone call and direct BTE component 602 and/or ITE component 604 to use the first ambient sound attenuation setting during the phone call. For example, system 100 may direct an active vent of ITE component 604 to close during the phone call and/or may direct BTE component 602 and/or ITE component 604 to reduce the loudness of the ambient sound perceived by the user to be below a predefined value.

At operation 708, system 100 may conduct the phone call during which an audio signal may be streamed from computing device 204 (e.g., a smartphone, a tablet computer, a laptop computer, etc.) to BTE component 602 and ITE component 604 and the ambient sound is attenuated according to the first ambient sound attenuation setting.

During the phone call, system 100 may determine whether button 608-2 has been pressed at operation 710. In certain examples, button 608-2 may be selectable to implement a second ambient sound attenuation setting for only a predefined time period after initiation of the phone call. For example, button 608-2 may be selectable to implement a second ambient sound attenuation setting for only five seconds. After expiration of the five seconds, a function of button 608-2 may revert back to another function associated with BTE component 602 and ITE component 604. For example, button 608-2 may revert back to being configured to be used as an on/off button.

If the answer at operation 710 is "YES," system 100 may perform an operation to deactivate the ambient sound. For example, system 100 may direct BTE component 602 and/or ITE component 604 to mute a microphone that may otherwise be used to detect ambient sound. Additionally or alternatively, system 100 may direct an active vent of ITE component 604 to close to prevent the ambient sound from reaching the ear canal of the user. The flow may then proceed to operation 714 in which the phone call may be conducted while the ambient sound is deactivated.

If the answer at operation 710 is "NO," the phone call may be continued at operation 714 with the ambient sound being attenuated according to the first ambient sound attenuation setting.

At operation 716, system 100 may determine that the phone call has been ended in any suitable manner and may hang up the phone call. For example, system 100 may detect another user input by way of one of buttons 608 to end the phone call. Alternatively, system 100 may detect a user input provided by way of computing device 204 to end the phone call. Alternatively, system 100 may detect any suitable voice command configured to end the phone call.

At operation 718, system 100 may activate the ambient sound in any suitable manner and may return the flow to operation 702 where an additional incoming call may be detected.

Figure 8:
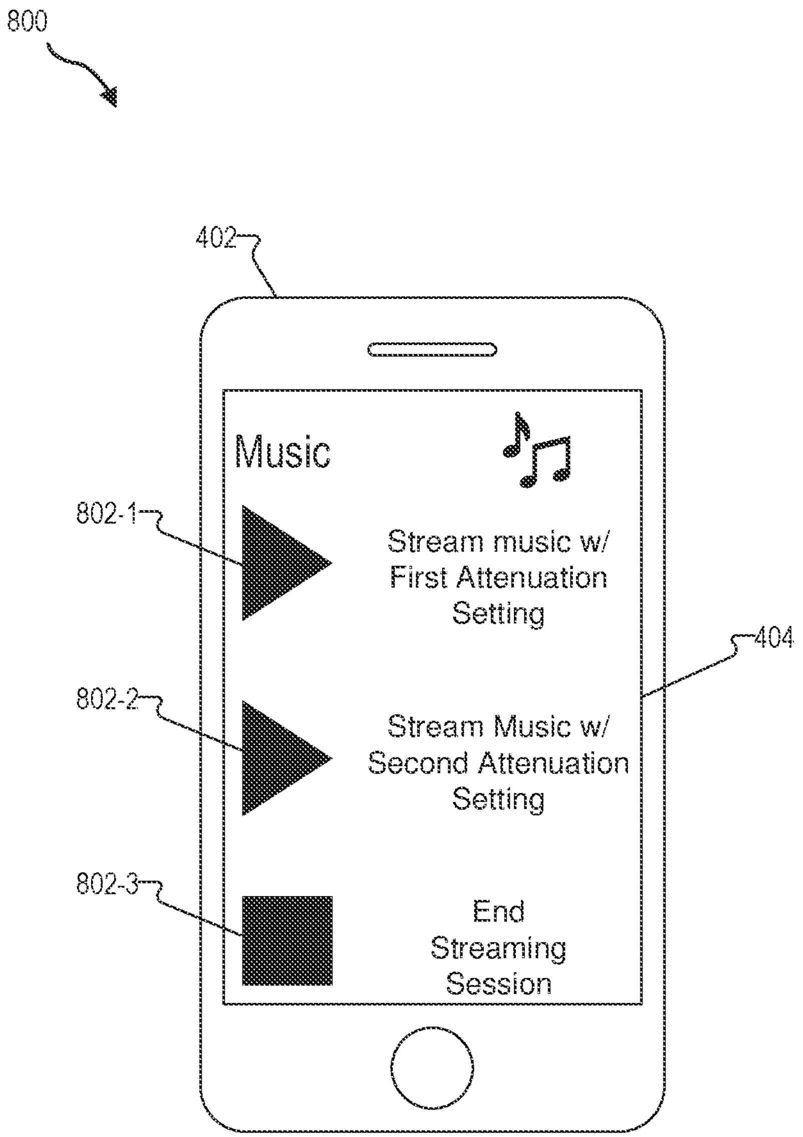
FIG. 8 illustrates another exemplary user interface that may be provided for display on a display screen of a computing device according to principles described herein.

FIG. 8 shows an exemplary implementation 800 in which computing device 204 may be implemented as smartphone 402 and an audio streaming session may be associated with a music streaming session in which an audio signal representing music is streamed from smartphone 402 to hearing device 202. As shown in FIG. 8, display screen 404 may display a graphical user interface that includes a plurality of options 802 (e.g., options 802-1 through 802-3) that a user may interact with when determining whether to initiate or end a music streaming session. In the example shown in FIG. 8, the graphical user interface may be considered as specialized user interface configured to facilitate user selection of a plurality of ambient sound attenuation settings prior to initiation of a music streaming session and/or during a music streaming session. As shown in FIG. 8, option 802-1 may be selectable by a user through a touch input to start streaming the music and direct hearing device 202 to use a first ambient sound attenuation setting. Option 802-2 may be selectable by the user through a touch input to start streaming the music and direct hearing device 202 to use a second ambient sound attenuation setting that is different than the first ambient sound attenuation setting. Option 802-3 may be selected by the user to stop the music streaming session.

Figure 9:
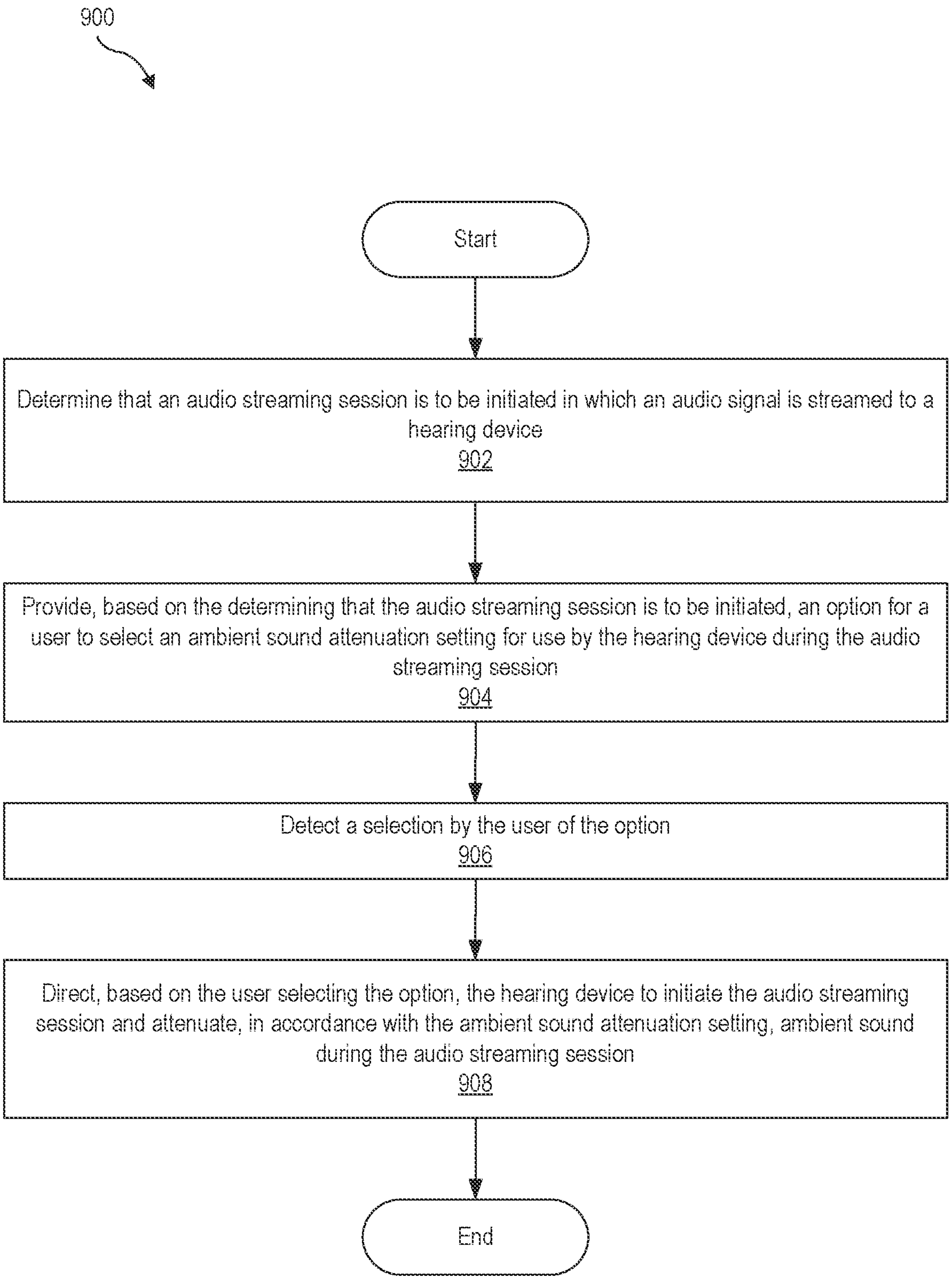
FIG. 9 illustrates an exemplary method according to principles described herein.

FIG. 9 illustrates an exemplary method 900 for facilitating user control of ambient sound attenuation during an audio streaming session according to principles described herein. While FIG. 9 illustrates exemplary operations according to one embodiment, other embodiments may omit, add to, reorder, and/or modify any of the operations shown in FIG. 9. One or more of the operations shown in FIG. 9 may be performed by a hearing device such as hearing device 202 a computing device such as computing device 204, any components included therein, and/or any combination or implementation thereof.

At operation 902, an ambient sound attenuation system such as ambient sound attenuation system 100 may determine that an audio streaming session is to be initiated in which an audio signal is streamed to a hearing device. Operation 902 may be performed in any of the ways described herein.

At operation 904, the ambient sound attenuation system may provide, based on the determining that the audio streaming session is to be initiated, an option for a user to select an ambient sound attenuation setting for use by the hearing device during the audio streaming session. Operation 904 may be performed in any of the ways described herein.

At operation 906, the ambient sound attenuation system may detect a selection by the user of the option. Operation 906 may be performed in any of the ways described herein.

At operation 908, the ambient sound attenuation system may direct, based on the user selecting the option, the hearing device to initiate the audio streaming session and attenuate, in accordance with the ambient sound attenuation setting, ambient sound during the audio streaming session. Operation 908 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 10:
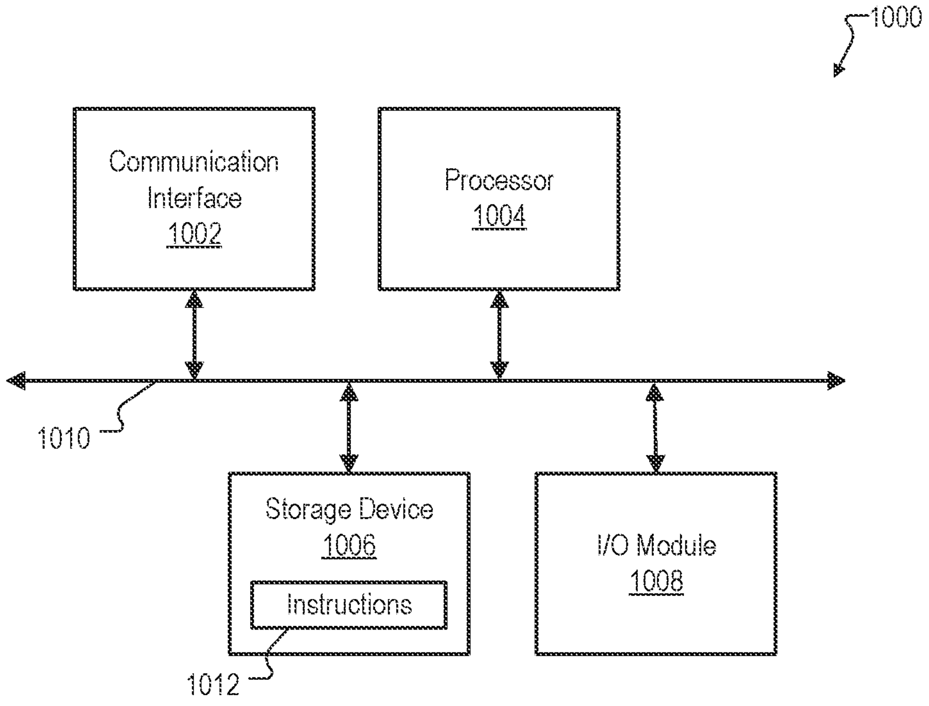
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example; data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display); a receiver (e.g., an RF or infrared receiver), motion sensors, and/or one or more input buttons.

I/O module 1008 may include one or more devices for presenting output to a user, including, but not limited to, a graphics engine, a display (e.g.; a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 1000. For example, memory 102 or memory 208 may be implemented by storage device 1006, and processor 104 or processor 210 may be implemented by processor 1004.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

a memory storing instructions; and a processor communicatively coupled to the memory and configured to execute the instructions to:

determine that an audio streaming session is to be initiated in which an audio signal is streamed to a hearing device;

provide, based on the determining that the audio streaming session is to be initiated, an option for a user to select an ambient sound attenuation setting for use by the hearing device during the audio streaming session;

detect a selection by the user of the option;

direct, based on the user selecting the option, the hearing device to initiate the audio streaming session and attenuate, in accordance with the ambient sound attenuation setting, ambient sound during the audio session;

provide an additional option for the user to select an additional ambient sound attenuation setting for use by the hearing device during the audio streaming session;

detect a selection by the user of the additional option; and direct, based on the user selecting the additional option, the hearing device to attenuate the ambient sound during the audio streaming session in accordance with the additional ambient sound attenuation setting instead of the ambient sound attenuation setting.

2. The system of claim 1, wherein the directing of the hearing device to attenuate the ambient sound includes directing the hearing device to change a loudness of the ambient sound that the user perceives by way of the hearing device to be at or below a predefined value.

3. The system of claim 1, wherein the attenuating of the ambient sound includes muting a microphone of the hearing device.

4. The system of claim 1, wherein the directing of the hearing device to attenuate the ambient sound includes dynamically controlling operation of an active vent of the hearing device during the audio streaming session.

5. The system of claim 4, wherein the dynamically controlling of the operation of the active vent of the hearing device is based on at least one of a detected context of the audio streaming session, an ambient sound level during the audio streaming session, or user preference data.

6. The system of claim 1, wherein the audio signal that is streamed to the hearing device during the audio streaming session represents audio content from at least one of an audio phone call, a video phone call, a music streaming session, or a media program streaming session.

7. The system of claim 1, wherein the selection of the option by the user is provided by way of a user interface of a computing device separate from and communicatively coupled to the hearing device.

8. The system of claim 7, wherein:

the user interface of the computing device is a graphical user interface on which a first attenuation setting option and a second attenuation setting option are provided for display, the first attenuation setting option different than the second attenuation setting option; and the selection of the option is provided with respect to one of the first attenuation setting option and the second attenuation setting option.

9. The system of claim 1, wherein the selection of the option by the user is provided by way of a user interface of the hearing device.

10. The system of claim 9, wherein:

the user interface of the hearing device is configured to receive a first user input command to select a first attenuation setting option and a second user input command to select a second attenuation setting option, the first attenuation setting option different than the second attenuation setting option; and the selection by the user of the option is provided by way of one of the first user input command and the second user input command to select the first attenuation setting option or the second attenuation setting option.

11. The system of claim 10, wherein:

the first user input command is provided by way of a button of the hearing device;

the button is configured to be used to select the first attenuation setting option for a predefined period of time associated with the audio streaming session; and after expiration of the predefined period of time, the button is configured to be used to select an additional setting associated with operation of the hearing device.

12. A system comprising:

a hearing device configured to assist a user in hearing, the hearing device including a first user interface; and a computing device communicatively coupled to the hearing device and including a second user interface, the computing device configured to:

provide an option for a user to select, by way of at least one of the first user interface and the second user interface, an ambient sound setting for use by the hearing device during an audio streaming session in which an audio signal is streamed to the hearing device;

detect a selection by the user of the option; and direct, based on the user selecting the option, the hearing device to initiate the audio streaming session and attenuate, in accordance with the ambient sound attenuation setting, ambient sound during the audio streaming session, wherein:

the hearing device is included as part of a binaural hearing system in which the hearing device is associated with a first ear of the user and an additional hearing device is associated with a second ear of the user; and the directing of the hearing device to attenuate the ambient sound during the audio streaming session includes directing an active vent of the hearing device to close and directing an active vent of the additional hearing device to remain open during the audio streaming session.

13. The system of claim 12, wherein the directing of the hearing device to attenuate the ambient sound includes directing the hearing device to change a loudness of the ambient sound that the user perceives by way of the hearing device to be at or below a predefined value.

14. The system of claim 12, wherein the directing of the hearing device to attenuate the ambient sound includes dynamically controlling operation of an active vent of the hearing device during the audio streaming session.

15. The system of claim 12, wherein:

the user interface of the computing device is a graphical user interface on which a first attenuation setting option and a second attenuation setting option are provided for display, the first attenuation setting option different than the second attenuation setting option; and the selection of the option is provided with respect to one of the first attenuation setting option and the second attenuation setting option.

16. The system of claim 12, wherein the computing device is further configured to:

provide, by way of at least one of the first user interface and the second user interface, an additional option for the user to select an additional ambient sound attenuation setting for use by the hearing device during the audio streaming session;

detect a selection by the user of the additional option; and direct, based on the user selecting the additional option, the hearing device to attenuate the ambient sound during the audio streaming session in accordance with the additional ambient sound attenuation setting instead of the ambient sound attenuation setting.

17. A hearing device configured to assist a user in hearing, the hearing device including a user interface, the hearing device configured to:

provide an option for a user to select, by way of the user interface, an ambient sound setting for use by the hearing device during an audio streaming session in which an audio signal is streamed to the hearing device;

detect a selection by the user of the option;

initiate, based on the user selecting the option, the audio streaming session and attenuate, in accordance with the ambient sound attenuation setting, ambient sound during the audio streaming session;

provide an additional option for the user to select an additional ambient sound attenuation setting for use by the hearing device during the audio streaming session;

detect a selection by the user of the additional option; and direct, based on the user selecting the additional option, the hearing device to attenuate the ambient sound during the audio streaming session in accordance with the additional ambient sound attenuation setting instead of the ambient sound attenuation setting.

18. A method comprising:

determining, by an ambient sound attenuation system, that an audio streaming session is to be initiated in which an audio signal is streamed to a hearing device;

providing, by the ambient sound attenuation system and based on the determining that the audio streaming session is to be initiated, an option for a user to select an ambient sound attenuation setting for use by the hearing device during the audio streaming session;

detecting, by the ambient sound attenuation system, a selection by the user of the option; and directing, by the ambient sound attenuation system and based on the user selecting the option, the hearing device to initiate the audio streaming session and attenuate, in accordance with the ambient sound attenuation setting, ambient sound during the audio streaming session.

* * * * *